United States Patent
Tanaka et al.

(10) Patent No.: US 10,193,406 B2
(45) Date of Patent: Jan. 29, 2019

(54) ROTATING MACHINERY

(71) Applicant: MITSUBISHI HITACHI POWER SYSTEMS, LTD., Yokohama (JP)

(72) Inventors: Kiyoteru Tanaka, Yokohama (JP); Kazuhiko Takahashi, Yokohama (JP); Toru Muto, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 225 days.

(21) Appl. No.: 15/372,961

(22) Filed: Dec. 8, 2016

(65) Prior Publication Data

US 2017/0170698 A1 Jun. 15, 2017

(30) Foreign Application Priority Data

Dec. 11, 2015 (JP) ................. 2015-241875

(51) Int. Cl.
*H02K 3/28* (2006.01)
(52) U.S. Cl.
CPC ...................... *H02K 3/28* (2013.01)
(58) Field of Classification Search
CPC ............... H02K 3/28; H02K 3/12; H02K 3/04
USPC .................................................. 310/198, 208
See application file for complete search history.

(56) References Cited

U.S. PATENT DOCUMENTS

| | | | |
|---|---|---|---|
| 3,408,517 A | 10/1968 | Willyoung | |
| 3,476,964 A * | 11/1969 | Willyoung | H02K 3/28 310/198 |
| 6,388,357 B1 * | 5/2002 | Tokumasu | H02K 3/28 310/198 |
| 8,008,829 B2 | 8/2011 | Tokumasu et al. | |
| 2009/0096312 A1 * | 4/2009 | Tokumasu | H02K 3/28 310/198 |

FOREIGN PATENT DOCUMENTS

| | | |
|---|---|---|
| CH | 478 476 A | 9/1969 |
| EP | 2 093 862 A2 | 8/2009 |
| JP | 5060325 B2 | 8/2012 |

OTHER PUBLICATIONS

The Extended European Search Report dated May 23, 2017 in the EP Application No. 16201946.7.

* cited by examiner

*Primary Examiner* — Nguyen Tran
(74) *Attorney, Agent, or Firm* — Volpe and Koenig, P.C.

(57) ABSTRACT

Rotating machinery includes a rotor of 2n poles, 84n slots, and three-phase stator windings, where n is an integer equal to or greater than 1. A top coil and a bottom coil accommodated at the diametrically inner and outer sides of the slot are connected to each other to form the stator winding. The stator windings have 2n phase belts per one phase, the phase belt including two parallel windings. In at least one of the phase belts, the one coils are disposed in the order of the second, first, first, second, first, second, first, second, second, first, second, first, second, and first parallel windings; the other coils connected to the one coils are disposed in the order of the first, second, second, first, second, first, second, first, second, first, first, second, first, and second parallel windings.

6 Claims, 3 Drawing Sheets

ROTATING MACHINERY

CLAIM OF PRIORITY

The present application claims priority from Japanese Patent application serial No.2015-241875, filed on Dec. 11, 2015, the content of which is hereby incorporated by reference into this application.

BACKGROUND OF THE INVENTION

1. Field of the Invention

The present disclosure relates to rotating machinery, and particularly to rotating machinery suitable for use as a large generator such as, for example, a turbine generator.

2. Description of the Related Art

Generally, a large generator such as a turbine generator is configured from a rotor rotatable together with a rotary shaft and including a rotor iron core and rotor coils, and a stator disposed in an opposed relationship to the rotor with a predetermined gap left therebetween and including a stator iron core and stator coils (armature coils). The stator iron core is configured from stacked steel sheets and has slots formed at predetermined distances in a circumferential direction at the inner circumference side thereof and extending in an axial direction in order to accommodate the stator coils. A tooth exists between each adjacent ones of the slots in the circumferential direction, and the stator coils are accommodated in the slots such that two stator coils are accommodated at the upper and lower sides in a diametrical direction in each slot. The coil accommodated at the inner circumference side is called top coil, and the coil accommodated at the outer circumference side is called bottom coil.

Incidentally, since a generator of a large capacity outputs high current, electromagnetic force and heat generation of the stator coils are high. As a countermeasure for this, a method is taken wherein each stator coil is configured from a plurality of parallel circuits to decrease the current per one coil thereby to moderate electromagnetic force and temperature rise.

However, where the number of parallel circuits is not equal to a divisor of the number of poles, the parallel circuits are deviated in current, resulting in appearance of a deviation in current that circulates between the parallel circuits. The circulating current gives rise to a problem that it increases the loss of the stator coils and raises the temperature of the coils, resulting in a decrease in efficiency or the possibility of damage to coil insulation.

As a method for suppressing such circulating current as described above, a method of changing the combination of coil connections is available. According to this method, the coils are arranged changing the combination of coil connections taking the balance in voltage when the parallel circuits are released into consideration to suppress the unbalance in voltage.

Japanese Patent No. 5060325 (hereinafter referred to as Patent Document 1) can be listed as a document that discloses a technology for suppressing such circulating current as described above to suppress the unbalance in voltage. In Patent Document 1, a connection scheme of stator windings of rotating machinery of the two-pole, three-phase, four-parallel circuit and 84-slot type. According to the connection scheme, the voltage unbalance rate that is the rate of the unbalance in voltage is 0.18%. It is to be noted that the voltage unbalance rate is an index that indicates that, when it is low, the degree of the unbalance in voltage is low.

SUMMARY OF THE INVENTION

In Patent Document 1described above, a connection pattern is disclosed which suppresses the unbalance in voltage among stator windings of rotating machinery of the two-pole, three-phase, four-parallel circuit and 84-slot type. To suppress the unbalance in voltage as in the case of Patent Document 1 leads to decrease of the loss, namely, to reduction of the heat generation.

Accordingly, since to decrease the unbalance in voltage is a significant technology from the point of view of ensuring the reduced size, increased capacity, and reliability of a generator, it is demanded to implement further suppression of the voltage unbalance and reduce the loss of the generator.

Therefore, it is desirable to provide rotating machinery that further suppresses the unbalance in voltage among stator windings of a conventional generator to further reduce the loss.

In order to attain the object described above, according to the present disclosure, there is provided rotating machinery including a rotor of 2n poles, n being an integer equal to or greater than 1, 84n slots, and three-phase stator windings, a top coil being accommodated at the diametrically inner side of each of the slots, a bottom coil being accommodated at the diametrically outer side of each of the slots, the top coil and the bottom coil being connected to each other to form each of the stator windings, the stator windings having 2n phase belts per one phase, each of the phase belts being configured from a first parallel winding and a second parallel winding, where an average position in the circumferential direction of all of the top coils and the bottom coils that configure each of the phase belts is the center of the phase belt and the arrangement of the first and second parallel windings on at least one of the phase belts is viewed in order from the side near to the center of the phase belt, the top or bottom coils being disposed in the order of the second, first, first, second, first, second, first, second, second, first, second, first, second, and first parallel windings while the bottom or top coils connected to the top or bottom coils are disposed in the order of the first, second, second, first, second, first, second, first, second, first, first, second, first, and second parallel windings, or where an average position in the circumferential direction of all of the top coils and the bottom coils that configure each of the phase belts is the center of the phase belt and the arrangement of the first and second parallel windings on at least one of the phase belts is viewed in order from the side near to the center of the phase belt, the top or bottom coils being disposed in the order of the second, first, first, second, first, second, second, first, first, second, second, first, second, and first parallel windings while the bottom or top coils connected to the top or bottom coils are disposed in the order of the first, second, second, first, second, first, second, first, second, first, first, second, first, and second parallel windings, or else where an average position in the circumferential direction of all of the top coils and the bottom coils that configure each of the phase belts is the center of the phase belt and the arrangement of the first and second parallel windings on at least one of the phase belts is viewed in order from the side near to the center of the phase belt, the top or bottom coils being disposed in the order of the first, second, first, second, second, first, second, first, second, first, first, second, second, and first parallel windings while the bottom or top coils connected to the top or bottom coils are disposed in the order of the second, first, second, first, first, second, first, second, second, first, second, first, first, and second parallel windings.

With the present disclosure, rotating machinery that further suppresses the unbalance in voltage among conventional stator windings and includes stator windings that reduces the loss can be provided.

DESCRIPTION OF THE PREFERRED EMBODIMENTS

Figure 1:
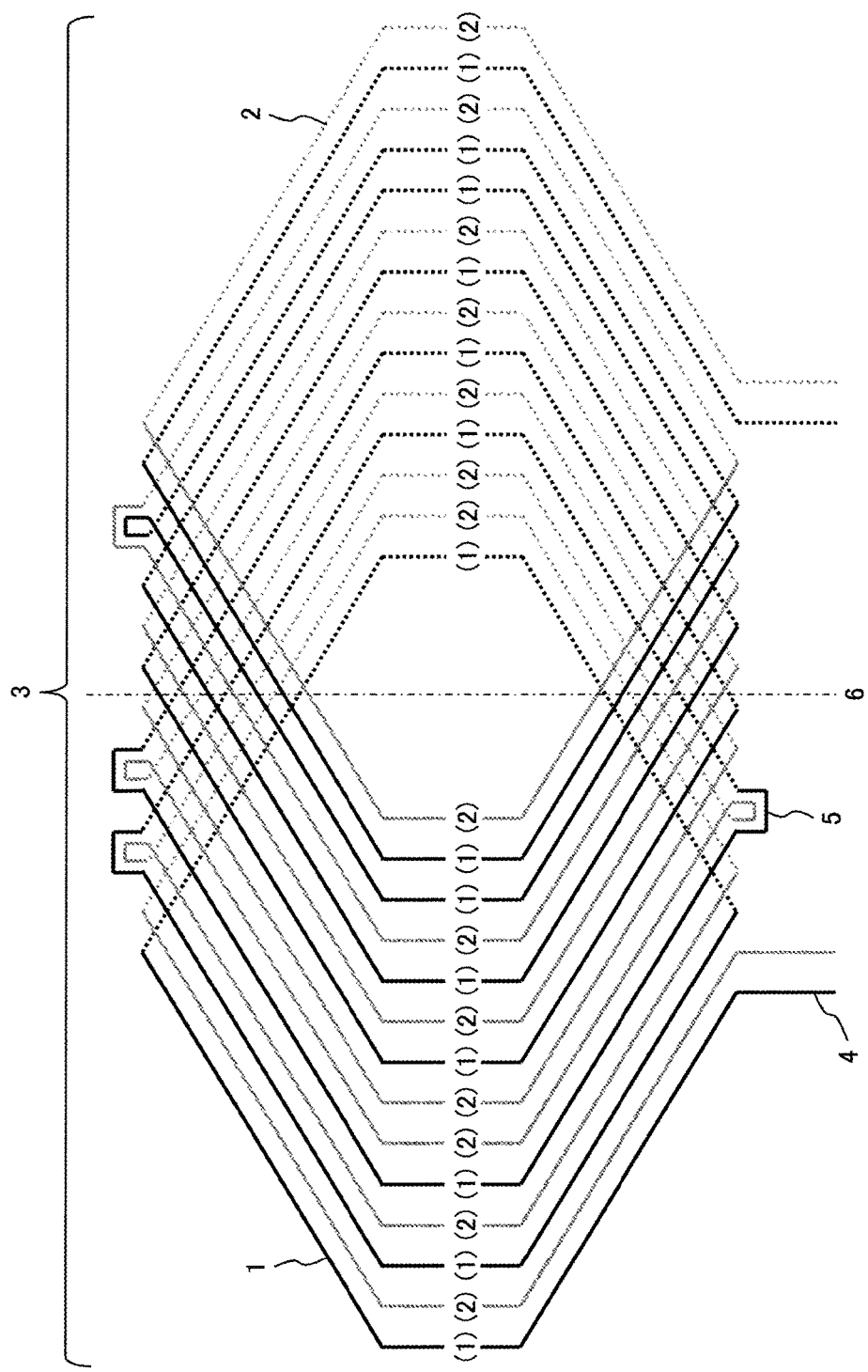
FIG. 1 is a diagrammatic view illustrating a connection scheme of one phase belt in a first embodiment of rotating machinery of the present disclosure.

In the following, the rotating machinery of the present disclosure is described in connection with embodiments depicted in the drawings. It is to be noted that the same elements in the embodiments are denoted by the same reference numerals.

First Embodiment

FIG. 1 illustrates a connection scheme of one phase belt in a first embodiment of the rotating machinery of the present disclosure.

As illustrated in FIG. 1, the present embodiment adopts the following connection scheme. In particular, the rotating machinery includes a rotor of 2n poles, 84n slots, and three-phase stator windings, where n is an integer equal to or greater than 1. A top coil 1 is accommodated at the diametrically inner side and a bottom coil 2 is accommodated at the diametrically outer side of each slot, and the top coil 1 and the bottom coil 2 are connected to each other to form a stator winding. The stator windings have 2n phase belts 3 per one phase, and each of the phase belts 3 is configured from two parallel windings. Where an average position in the circumferential direction of all of the top coils 1 and the bottom coils 2 that configure each of the phase belts 3 is the center of the phase belt 3 (phase belt center 6) and the arrangement of the first and second parallel windings on at least one phase belt 3 is viewed in order from the side near to the center of the phase belt 3 (phase belt center 6), the top coils 1 are disposed in the order of the second, first, first, second, first, second, first, second, second, first, second, first, second, and first parallel windings while the bottom coils 2 connected to the top coils 1 are disposed in the order of the first, second, second, first, second, first, second, first, second, first, first, second, first, and second parallel windings. By the configuration described, the voltage unbalance rate indicative of the degree of unbalance in voltage becomes 0.07%.

This voltage unbalance rate is derived by vector calculation of a voltage V generated for each of the slots, in which the coils are accommodated, by the following expression:

$$V = \cos((Sn-1) \times (A/(180 \times \pi))) + j(\sin((Sn-1) \times (A/(180 \times \pi)))) \quad (1)$$

where Sn is a number of a slot in which each coil is accommodated, and A is a phase angle of a voltage vector per one slot. The voltage V generated in each coil was calculated for each of the coils disposed in a first circuit and a second circuit. On the basis of results of the calculation, a voltage unbalance rate was determined from an average value in amplitude of the first and second circuits and a ratio in amplitude between the first and second circuits.

Here, the phase belt 3 is defined as a coil group of the top coils 1 and the bottom coils 2 arranged for one pole. It is to be noted that reference numeral 4 denotes a lead wire, and reference numeral 5 denotes a jumper connector.

By adopting such a configuration of the present embodiment as described above, the voltage unbalance rate, which was 0.18% in Patent Document 1, can be reduced to 0.07%. Therefore, rotating machinery of a small size and a large capacity can be obtained which suppresses the unbalance in voltage and reduces heat generation by circulating current. Further, from the point of view of reduction of the loss, the reduction of the voltage unbalance rate leads also to improvement in efficiency (performance) of the rotating machinery.

It is to be noted that, even if the arrangement of the top coil 1 and the bottom coil 2 is reversed, a similar electric performance can be obtained, and therefore, unless otherwise specified, also a connection scheme in which the top coil 1 and the bottom coil 2 are replaced with each other is included in the present embodiment.

In particular, also the arrangement is equivalent in which the top coils 1 are arranged in the order of the first, second, second, first, second, first, second, first, second, first, first, second, first, and second parallel windings and the bottom coils 2 are arranged in the order of the second, first, first, second, first, second, first, second, second, first, second, first, second, and first parallel windings.

Also the configuration just described exhibits advantageous effects similar to those described hereinabove.

Second Embodiment

Figure 2:
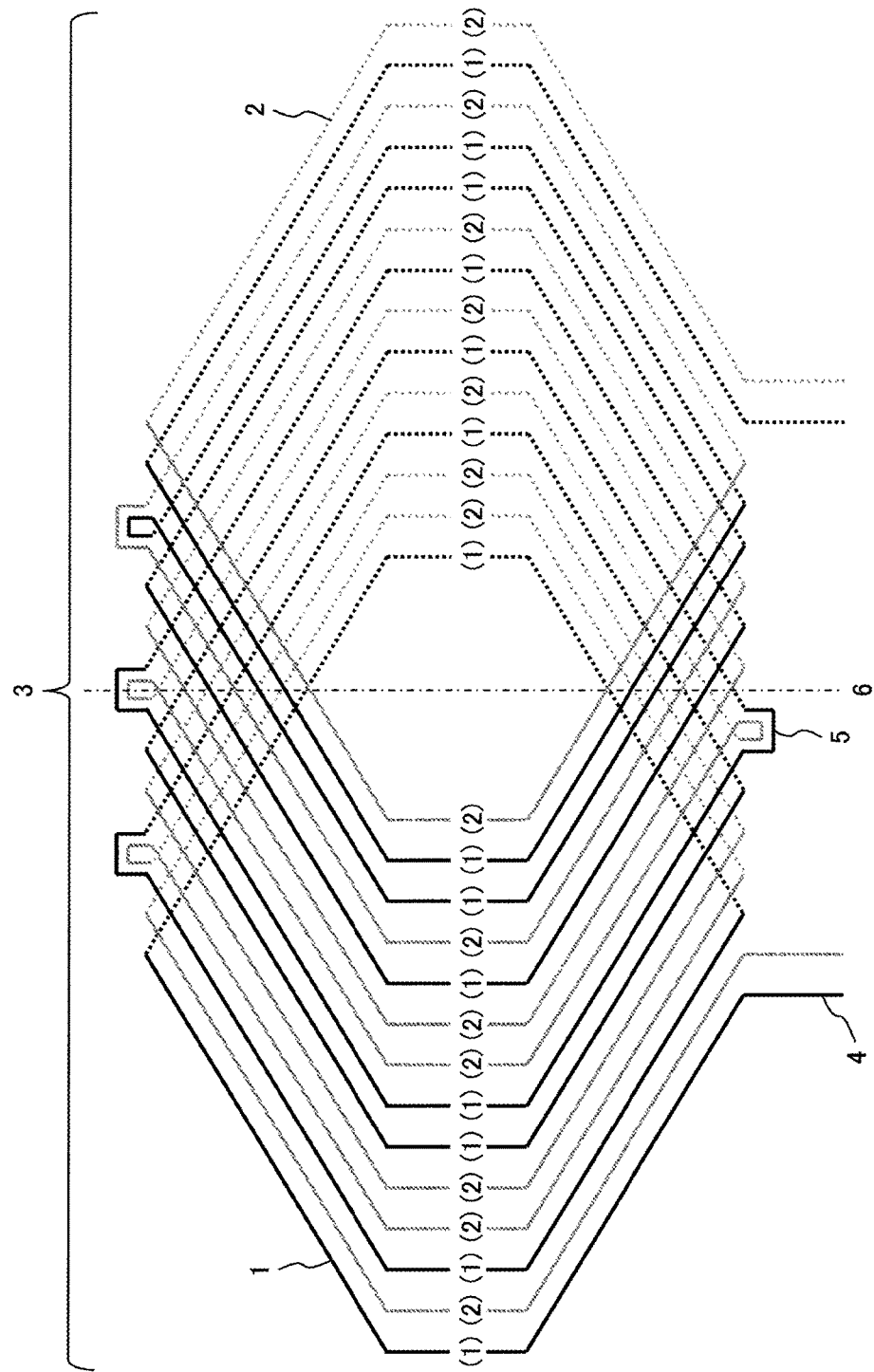
FIG. 2 is a diagrammatic view illustrating a connection scheme of one phase belt in a second embodiment of the rotating machinery of the present disclosure.

FIG. 2 illustrates a connection scheme of one phase belt according to a second embodiment of the rotating machinery of the present disclosure.

As illustrated in FIG. 2, the present embodiment adopts the following connection scheme. In particular, the rotating machinery includes, where n is an integer equal to or greater than 1, a rotor of 2n poles, 84n slots, and three-phase stator windings. A top coil 1 is accommodated at the diametrically inner side and a bottom coil 2 is accommodated at the diametrically outer side of each slot, and the top coil 1 and the bottom coil 2 are connected to each other to form a stator winding. The stator windings have 2n phase belts 3 per one phase, and each of the phase belts 3 is configured from two parallel windings. Where an average position in the circumferential direction of all of the top coils 1 and the bottom coils 2 that configure each of the phase belts 3 is the center of the phase belt 3 (phase belt center 6) and the arrangement of the first and second parallel windings on at least one phase belt 3 is viewed in order from the side near to the center of the phase belt 3 (phase belt center 6), the top coils 1 are disposed in the order of the second, first, first, second, first, second, second, first, first, second, second, first, second, and first parallel windings while the bottom coils 2 connected to the top coils 1 are disposed in the order of the first, second, second, first, second, first, second, first, second, first, first, second, first, and second parallel windings. By the configuration described, the voltage unbalance rate indicative of the degree of unbalance in voltage becomes 0.15%.

The voltage unbalance rate of 0.15% was calculated by a method same as that described in the description of the first embodiment. The voltage unbalance rate of 0.15% in the present embodiment was determined, based on results of calculation, for each of first and second circuits, of a voltage V generated for each of the slots in which the coils are accommodated, from an average value in amplitude of the first and second circuits and a ratio in amplitude of the voltages generated in the first and second circuits similarly as in the method described in connection with the first embodiment.

Here, the phase belt 3 is defined as a coil group of the top coils 1 and the bottom coils 2 arranged for one pole.

By adopting such a configuration of the present embodiment as described above, the voltage unbalance rate, which was 0.18% in Patent Document 1, can be reduced to 0.15%. Therefore, rotating machinery of a small size and a large capacity can be obtained which suppresses the unbalance in voltage and reduces heat generation by circulating current. Further, from the point of view of reduction of the loss, the reduction of the voltage unbalance rate leads also to improvement in efficiency (performance) of the rotating machinery.

It is to be noted that, even if the arrangement of the top coil 1 and the bottom coil 2 is reversed, a similar electric performance can be obtained, and therefore, unless otherwise specified, also a connection scheme in which the top coil 1 and the bottom coil 2 are replaced with each other is included in the present embodiment.

In particular, also the arrangement is equivalent in which the top coils 1 are arranged in the order of the first, second, second, first, second, first, second, first, second, first, first, second, first, and second parallel windings and the bottom coils 2 are arranged in the order of the second, first, first, second, first, second, second, first, first, second, second, first, second, and first parallel windings.

Also the configuration just described exhibits advantageous effects similar to those described hereinabove.

Third Embodiment

Figure 3:
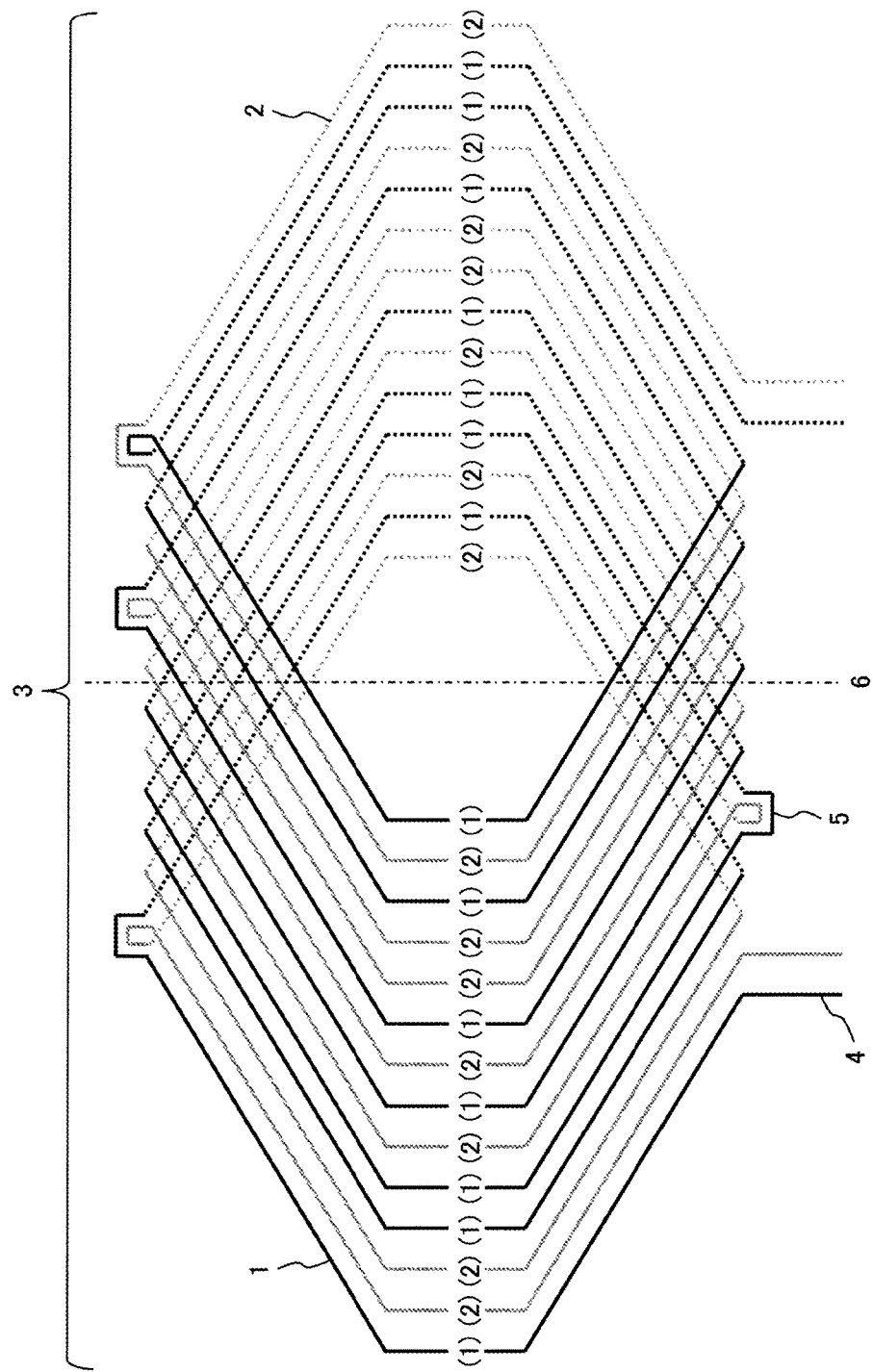
FIG. 3 is a diagrammatic view illustrating a connection scheme of one phase belt in a third embodiment of the rotating machinery of the present disclosure.

FIG. 3 illustrates a connection scheme of one phase belt according to a third embodiment of the rotating machinery of the present disclosure.

As illustrated in FIG. 3, the present embodiment adopts the following connection scheme. In particular, the rotating machinery includes, where n is an integer equal to or greater than 1, a rotor of 2n poles, 84n slots, and three-phase stator windings. A top coil 1 is accommodated at the diametrically inner side and a bottom coil 2 is accommodated at the diametrically outer side of each slot, and the top coil 1 and the bottom coil 2 are connected to each other to form a stator winding. The stator windings have 2n phase belts 3 per one phase, and each of the phase belts 3 is configured from two parallel windings. Where an average position in the circumferential direction of all of the top coils 1 and the bottom coils 2 that configure each of the phase belts 3 is the center of the phase belt 3 (phase belt center 6) and the arrangement of the first and second parallel windings on at least one phase belt 3 is viewed in order from the side near to the center of the phase belt 3 (phase belt center 6), the top coils 1 are disposed in the order of the first, second, first, second, second, first, second, first, second, first, first, second, second, and first parallel windings while the bottom coils 2 connected to the top coils 1 are disposed in the order of the second, first, second, first, first, second, first, second, second, first, second, first, first, and second parallel windings. By the configuration described, the voltage unbalance rate indicative of the degree of unbalance in voltage becomes 0.16%.

The voltage unbalance rate of 0.16% was calculated by a method same as that described in the description of the first embodiment. The voltage unbalance rate of 0.16% in the present embodiment was determined, based on results of calculation, for each of first and second circuits, of a voltage V generated for each of the slots in which the coils are accommodated, from an average value in amplitude of the first and second circuits and a ratio in amplitude of the voltages generated in the first and second circuits similarly as in the method described in connection with the first embodiment.

Here, the phase belt 3 is defined as a coil group of the top coils 1 and the bottom coils 2 arranged for one pole.

By adopting such a configuration of the present embodiment as described above, the voltage unbalance rate, which was 0.18% in Patent Document 1, can be reduced to 0.16%. Therefore, rotating machinery of a small size and a large capacity can be obtained which suppresses the unbalance in voltage and reduces heat generation by circulating current. Further, from the point of view of reduction of the loss, the reduction of the voltage unbalance rate leads also to improvement in efficiency (performance) of the rotating machinery.

It is to be noted that, even if the arrangement of the top coil 1 and the bottom coil 2 is reversed, a similar electric performance can be obtained, and therefore, unless otherwise specified, also a connection scheme in which the top coil 1 and the bottom coil 2 are replaced with each other is equivalent.

In particular, also the arrangement is equivalent in which the top coils 1 are arranged in the order of the second, first, second, first, first, second, first, second, second, first, second, first, first, and second parallel windings and the bottom coils 2 are arranged in the order of the first, second, first, second, second, first, second, first, second, first, first, second, second, and first parallel windings.

Also the configuration just described exhibits advantageous effects similar to those described hereinabove.

It is to be noted that the present disclosure is not limited to the embodiments described above, but includes various modifications. For example, the embodiments described above are described in detail in order to explain the present disclosure in a manner easy to understand, and the present disclosure is not necessarily limited to rotating machinery that includes all constituting features described hereinabove. Further, it is possible to replace some of the constituent features of any embodiment with those of a different one of the embodiments, and also it is possible to add a constituent feature of one of the embodiments to the constituent features of a different one of the embodiments. Further, it is possible to perform, for some of the constituent features of each embodiment, addition, deletion, or replacement of a different constituent feature.

DESCRIPTION OF REFERENCE NUMERALS

1 Top coil
2 Bottom coil
3 Phase belt
4 Lead wire
5 Jumper connector
6 Phase belt center

What is claimed is:

1. Rotating machinery comprising:
a rotor of 2n poles, n being an integer equal to or greater than 1;
84n slots; and
three-phase stator windings;
a top coil being accommodated at the diametrically inner side of each of the slots;
a bottom coil being accommodated at the diametrically outer side of each of the slots;
the top coil and the bottom coil being connected to each other to form each of the stator windings;
the stator windings having 2n phase belts per one phase;
each of the phase belts being configured from a first parallel winding and a second parallel winding;
where an average position in the circumferential direction of all of the top coils and the bottom coils that configure each of the phase belts is the center of the phase belt and the arrangement of the first and second parallel windings on at least one of the phase belts is viewed in order from the side near to the center of the phase belt, the top or bottom coils being disposed in the order of the second, first, first, second, first, second, first, second, second, first, second, first, second, and first parallel windings while the bottom or top coils connected to the top or bottom coils are disposed in the order of the first, second, second, first, second, first, second, first, second, first, first, second, first, and second parallel windings.

2. The rotating machinery according to claim 1,
wherein the arrangement of the top coils or the bottom coils indicates a voltage unbalance rate, which indicates a degree of unbalance in voltage, of 0.07%.

3. Rotating machinery comprising:
a rotor of 2n poles, n being an integer equal to or greater than 1;
84n slots; and
three-phase stator windings;
a top coil being accommodated at the diametrically inner side of each of the slots;
a bottom coil being accommodated at the diametrically outer side of each of the slots;
the top coil and the bottom coil being connected to each other to form each of the stator windings;
the stator windings having 2n phase belts per one phase;
each of the phase belts being configured from a first parallel winding and a second parallel winding;
where an average position in the circumferential direction of all of the top coils and the bottom coils that configure each of the phase belts is the center of the phase belt and the arrangement of the first and second parallel windings on at least one of the phase belts is viewed in order from the side near to the center of the phase belt, the top or bottom coils being disposed in the order of the second, first, first, second, first, second, second, first, first, second, second, first, second, and first parallel windings while the bottom or top coils connected to the top or bottom coils are disposed in the order of the first, second, second, first, second, first, second, first, second, first, first, second, first, and second parallel windings.

4. The rotating machinery according to claim 3,
wherein the arrangement of the top coils or the bottom coils indicates a voltage unbalance rate, which indicates a degree of unbalance in voltage, of 0.15%.

5. Rotating machinery comprising:
a rotor of 2n poles, n being an integer equal to or greater than 1;
84n slots; and
three-phase stator windings;
a top coil being accommodated at the diametrically inner side of each of the slots;
a bottom coil being accommodated at the diametrically outer side of each of the slots;
the top coil and the bottom coil being connected to each other to form each of the stator windings;
the stator windings having 2n phase belts per one phase;
each of the phase belts being configured from a first parallel winding and a second parallel winding;
where an average position in the circumferential direction of all of the top coils and the bottom coils that configure each of the phase belts is the center of the phase belt and the arrangement of the first and second parallel windings on at least one of the phase belts is viewed in order from the side near to the center of the phase belt, the top or bottom coils being disposed in the order of the first, second, first, second, second, first, second, first, second, first, first, second, second, and first parallel windings while the bottom or top coils connected to the top or bottom coils are disposed in the order of the second, first, second, first, first, second, first, second, second, first, second, first, first, and second parallel windings.

6. The rotating machinery according to claim 5,
wherein the arrangement of the top coils or the bottom coils indicates a voltage unbalance rate, which indicates a degree of unbalance in voltage, of 0.16%.

* * * * *